(12) United States Patent
Totsuka et al.

(10) Patent No.: US 7,097,603 B2
(45) Date of Patent: Aug. 29, 2006

(54) MACHINING CENTRE

(75) Inventors: Mikio Totsuka, Aichi-ken (JP); Michio Norimatsu, Aichi-ken (JP); Haruhiko Koike, Aichi-ken (JP); Hideyoshi Kagohashi, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 212 days.

(21) Appl. No.: 10/940,354

(22) Filed: Sep. 14, 2004

(65) Prior Publication Data

US 2005/0065005 A1 Mar. 24, 2005

(30) Foreign Application Priority Data

Sep. 19, 2003 (JP) ............................. 2003-327706

(51) Int. Cl.
*B23Q 3/157* (2006.01)
(52) U.S. Cl. ............................................ 483/56; 483/1
(58) Field of Classification Search ............ 483/54–57, 483/900, 1
See application file for complete search history.

(56) References Cited

U.S. PATENT DOCUMENTS 4,358,888 A * 11/1982 Zankl et al. ................. 483/54
4,620,347 A * 11/1986 Stark et al. .................. 483/56
4,621,407 A * 11/1986 Suzuki ......................... 483/56
4,670,964 A * 6/1987 Bleich ......................... 483/33
5,762,594 A * 6/1998 Hoppe ......................... 483/56

FOREIGN PATENT DOCUMENTS

EP 060638 A2 * 9/1982
JP 6-218645 A * 8/1994

* cited by examiner

*Primary Examiner*—Erica Cadugan
(74) *Attorney, Agent, or Firm*—Duane Morris LLP

(57) ABSTRACT

When exchanging a tool, a tool of a spindle is stored in an empty pocket of a tool magazine, and thereafter, upward movement of the spindle and rotation of the tool magazine are simultaneously executed. At this time, synchronous control is performed in order to prevent a collision between the spindle and the tool. When installing a next tool in the spindle, both downward movement of the spindle and rotation of the tool magazine are executed while synchronously controlling. The tool exchange time can be shortened with simultaneously executing the movements of the spindle and the tool magazine.

6 Claims, 10 Drawing Sheets

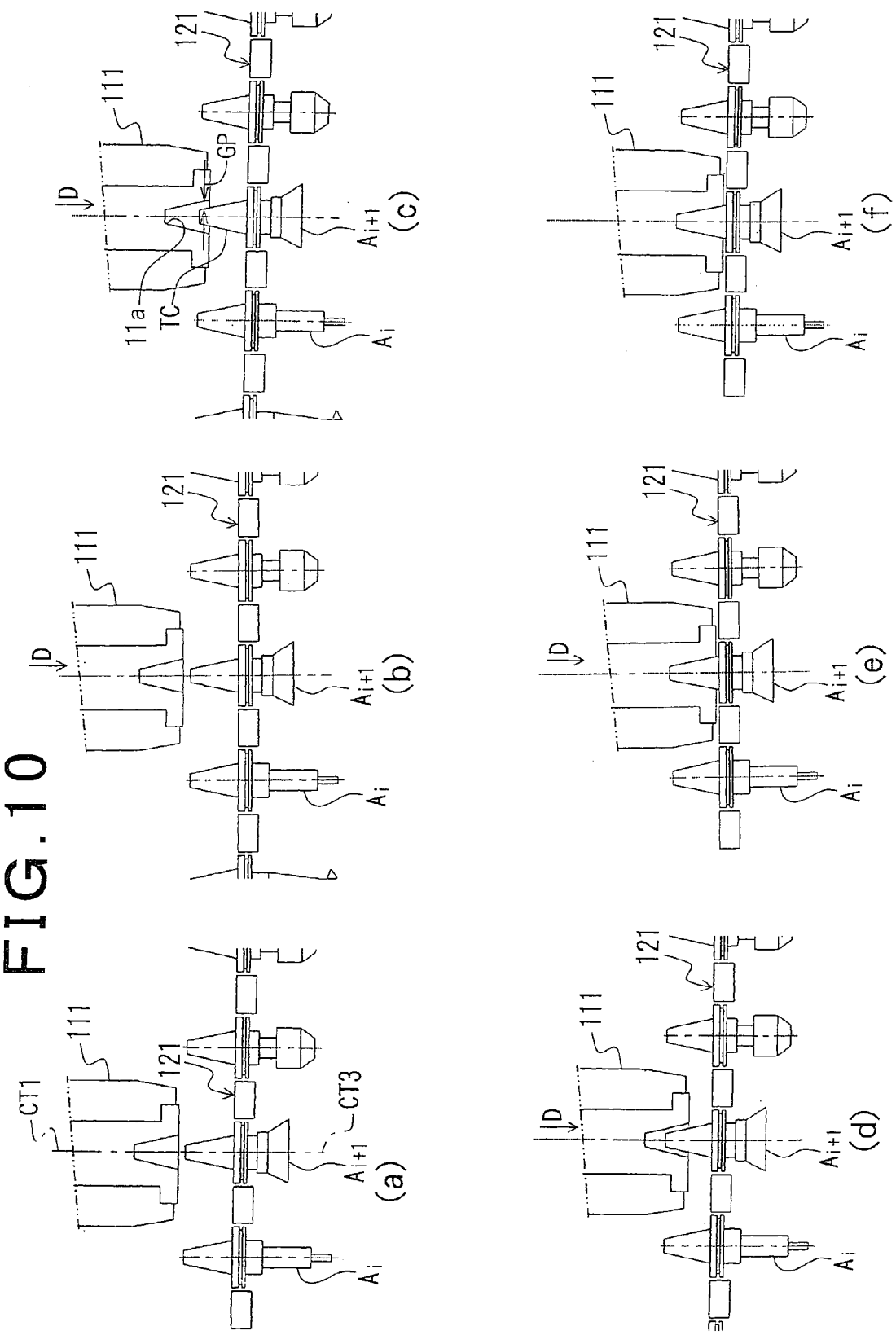

MACHINING CENTRE

BACKGROUND OF THE INVENTION

This invention relates to a machining centre for machining a workpiece, properly exchanging tools, and more specifically, to a machining centre with so-called armless-typed automatic tool changer.

A machining centre has a table for locating a workpiece thereon, a spindle for machining a workpiece by driving a supported tool, and an automatic tool changer for automatically exchanging a tool of the spindle, and is designed to machine a workpiece, properly exchanging tools. This automatic tool changer is an automatic tool exchanger with arm, which is comprised of an ATC arm, a shifter, an ATC arm driving unit, or an armless-typed automatic tool changer for exchanging tools by only operations of moving and positioning a tool magazine and a spindle without an ATC arm.

The latter armless-typed has a structure more simple than the former one with arm since an ATC arm, a shifter and an ATC arm driving unit are not necessary, thereby decreasing the cost of the unit and failure occurrence in tool exchange (see Japanese patent application; publication No. H06-218645).

Tool exchange operations in this arm-less type automatic tool changer are mentioned, referring to FIGS. 8 through 10. These figures are typically shown in order to show a conventional tool exchange method. That is, FIG. 8 is a typical explanation view showing ways of detaching the tool of the spindle and storing it in the tool magazine, FIG. 9 is a typical view showing ways of moving the tool magazine, and FIG. 10 is a typical view showing ways of installing the tool in the spindle.

In the figures, a reference number 111 denotes a spindle for driving a tool in order to execute machining operations on a workpiece, a reference number 121 denotes a tool magazine for storing various kinds of tools, a reference number Ai is a tool to be detached from the spindle 111 and to be stored in the tool magazine 121 ("the present tool" hereinafter), and a reference number Ai+1 denotes a tool to be scheduled to be installed in the spindle 111 ("the next tool" hereinafter).

FIG. 8(*a*) shows the way of moving the spindle 111 and inserting the present tool Ai in an empty pocket of the tool magazine 121. The present tool Ai is inserted into the empty pocket and, the engagement between the tool Ai and the spindle 111 is simultaneously released (see FIG. 8(*b*)). Thereafter, the spindle 111 is upwardly moved while holding the tool Ai by the pocket (see reference number U of FIG. 8(*b*) through (*e*)), and is stopped when the clearance between the spindle 111 and the tool Ai occurs (see FIG. 8(*f*)).

Next, the tool magazine 121 is rotated in the B direction for making the axial center CT1 of the spindle 111 close to the axial center CT3 of the next tool Ai+1 (see FIG. 9(*a*) through (*f*)), and the rotation of the tool magazine 121 is stopped when corresponding both the axial centers CT1 and CT3 with each other (see FIG. 10(*a*)). The spindle is lowered at the rotational position, and the next tool Ai+1 is installed (see number D of FIG. 10(*b*) through (*f*)).

Thereafter, the spindle 111 and the tool Ai+1 are separated from the tool magazine 121, and the machining operation on the workpiece is restarted.

In case of the above-mentioned armless typed automatic tool changer, the movement U and the stop of the spindle 111 (see FIG. 8), the movement B and stop of the tool magazine 121 (see FIG. 9) and the movement D of the spindle 111 (see FIG. 10) are executed in this order, so that the tool exchange takes a longer time and the producibility is not so good.

Under these situations, a machining centre for decreasing the machine cost and the error occurrence at the time of tool exchange, and for actualizing speedy tool exchange has been desired.

SUMMARY OF THE INVENTION

The invention is a machining centre having a spindle for executing machining operations on a workpiece by driving a tool attachably and detachably supported thereby, and a tool magazine having an empty pocket for storing the tool detached from the spindle and a tool pocket for storing an another tool for installing in the spindle, the machining centre for executing machining operations on the workpiece by driving the tool through the spindle while properly exchanging the tool with the tool magazine, the machining centre comprising:

a tapered tool installation portion formed at the spindle, for holding the tool by the spindle with an engagement with a taper shank portion of the tool;

a spindle drive control portion for executing at least one routine of both a tool detachment routine wherein the tool is stored in the empty tool pocket of the tool magazine, and then, the tool is detached from the spindle by driving and moving the spindle in a direction of an axial center of the spindle, and a tool installation routine wherein the spindle is driven and moved in the axial center direction in order to install the tool stored in the tool pocket in the spindle;

a pocket drive control portion for driving and moving the tool pocket in a direction orthogonal to the axial center direction of the spindle and for switching the tool pocket adjacent to the spindle; and a synchronous control portion for controlling the spindle drive control portion and the pocket drive control portion so as to simultaneously move the spindle in the axial center direction and move the tool pocket in a direction orthogonal to the axial center direction in order to execute the tool detachment routine or the tool installation routine.

In this case, the movement of the spindle in the axial center direction and the movement of the tool pocket in the direction orthogonal to the axial center direction are simultaneously executed in order to execute the tool detachment routine or the tool installation routine, so that the tool exchange time can be shorter than the case where the tool pocket is not driven and moved in both routines, thereby improving its producibility.

Besides, the invention is the machining centre, wherein the spindle drive control portion executes a spindle stop routine of stopping the spindle at a position, where a collision is avoidable between the spindle and the tool stored in the tool pocket, after executing the tool detachment routine, and then executes the tool installation routine.

According to this aspect of the invention, the spindle is stopped at a position where a collision between the spindle and the tool stored in the tool pocket can be avoided, so that it is possible to prevent the spindle from unnecessarily separating the tool magazine, thereby shortening the tool exchange time.

Besides, the invention is the machining centre, wherein a tool data memory portion for storing data of shapes of the tool is provided, and a movement distance computing means for obtaining a movement distance for moving the tool pocket or the spindle with no collision between the spindle and the tool on the basis of a movement distance of the spindle or the tool pocket and the data of the shapes of the tool owned by the tool data memory portion is provided, and the synchronous control portion executes the respective routines while moving the spindle or the tool pocket by the movement distance obtained by the movement distance computing means.

According to this aspect of the invention, the collision between the spindle and the tool can be avoided at the time of tool exchange even if the tool has any shape.

Besides, the invention is the machining centre, wherein a moving speed memory portion for storing spindle moving speed patters showing moving speed of the spindle in the axial center direction and tool pocket moving speed patterns showing moving speed of the tool pocket in the direction orthogonal to the axial center direction is provided, and the spindle drive control portion drives and moves the spindle with the spindle moving speed pattern stored in the moving speed memory potion, and the pocket drive control portion drives and moves the tool pocket with the tool pocket moving speed pattern stored in the moving speed memory portion, and the synchronous control portion controls start timing of movement and driving of the spindle with the spindle drive control portion and start timing of movement and driving of the tool pocket with the pocket drive control portion.

According to this aspect of the invention, the collision between the spindle and the tool can be avoided with the simple structure and the simple control at the time of tool exchange.

Besides, the invention is the machining centre, wherein the pocket drive control portion controls to continue moving and driving the tool pocket in the direction orthogonal to the axial center direction while the spindle drive control portion is executing the tool detachment routine, the spindle stop routine and the tool installation routine.

According to this aspect of the invention, the tool pocket can continue to be driven and moved, thereby shortening the tool exchange time and improving the producibility.

BRIEF DESCRIPTION OF THE DRAWINGS

FIG. 10 is a typical view showing ways of installing the tool in the spindle in the conventional tool exchange method.

DESCRIPTION OF THE PREFERRED EMBODIMENT

Figure 1:
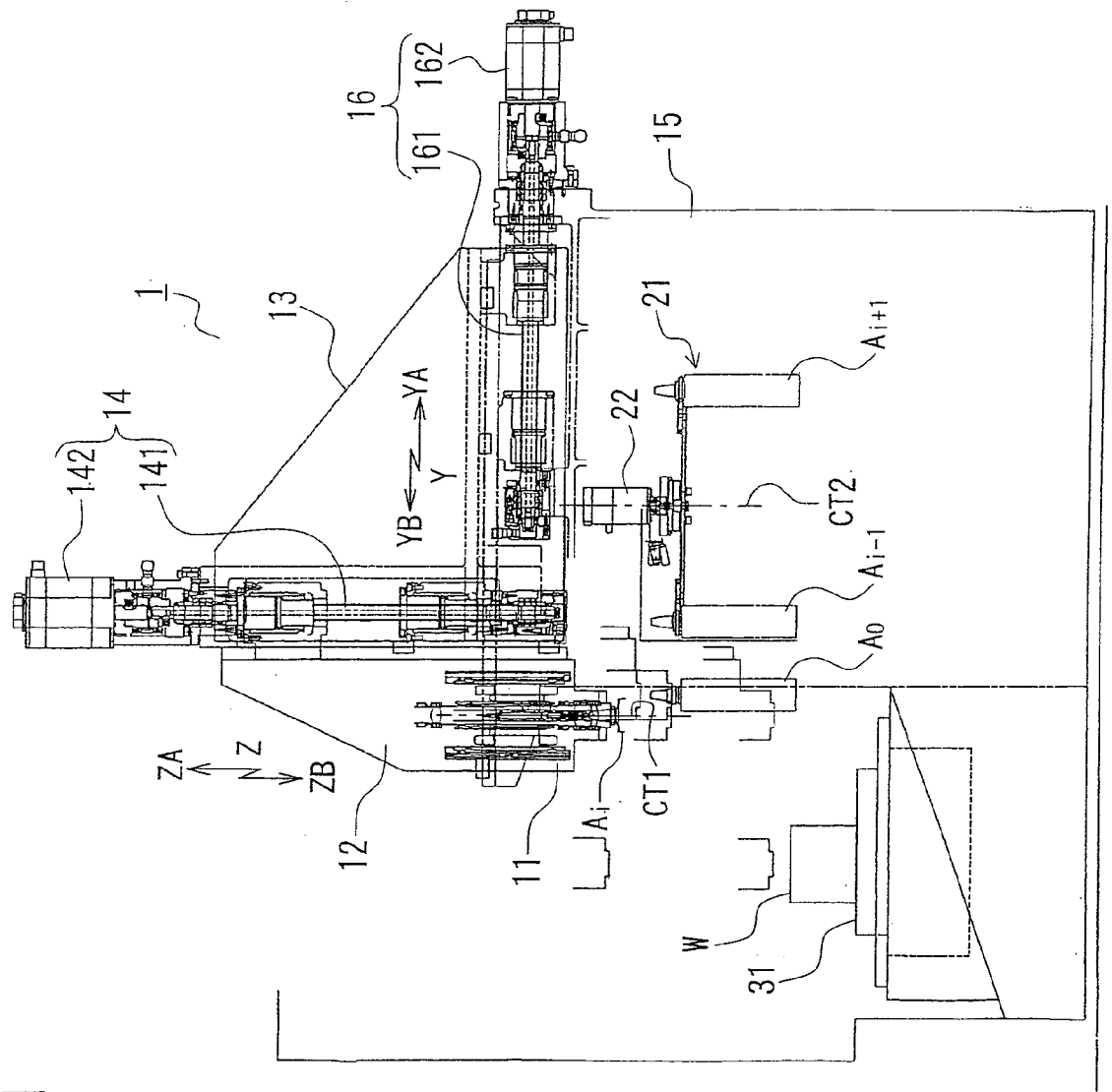
FIG. 1 is a side view showing a structure of a machining centre according to the invention.
Figure 2:
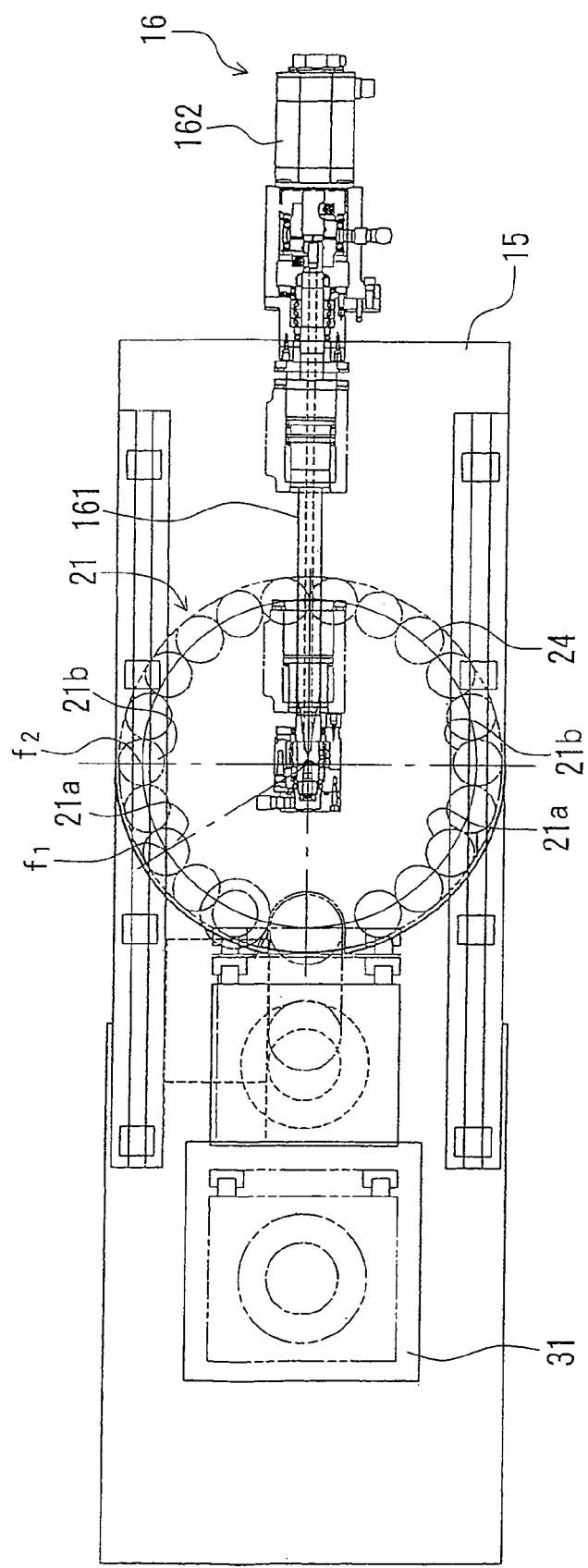
FIG. 2 is a top view showing a structure of the machining centre according to the invention.
Figure 3:
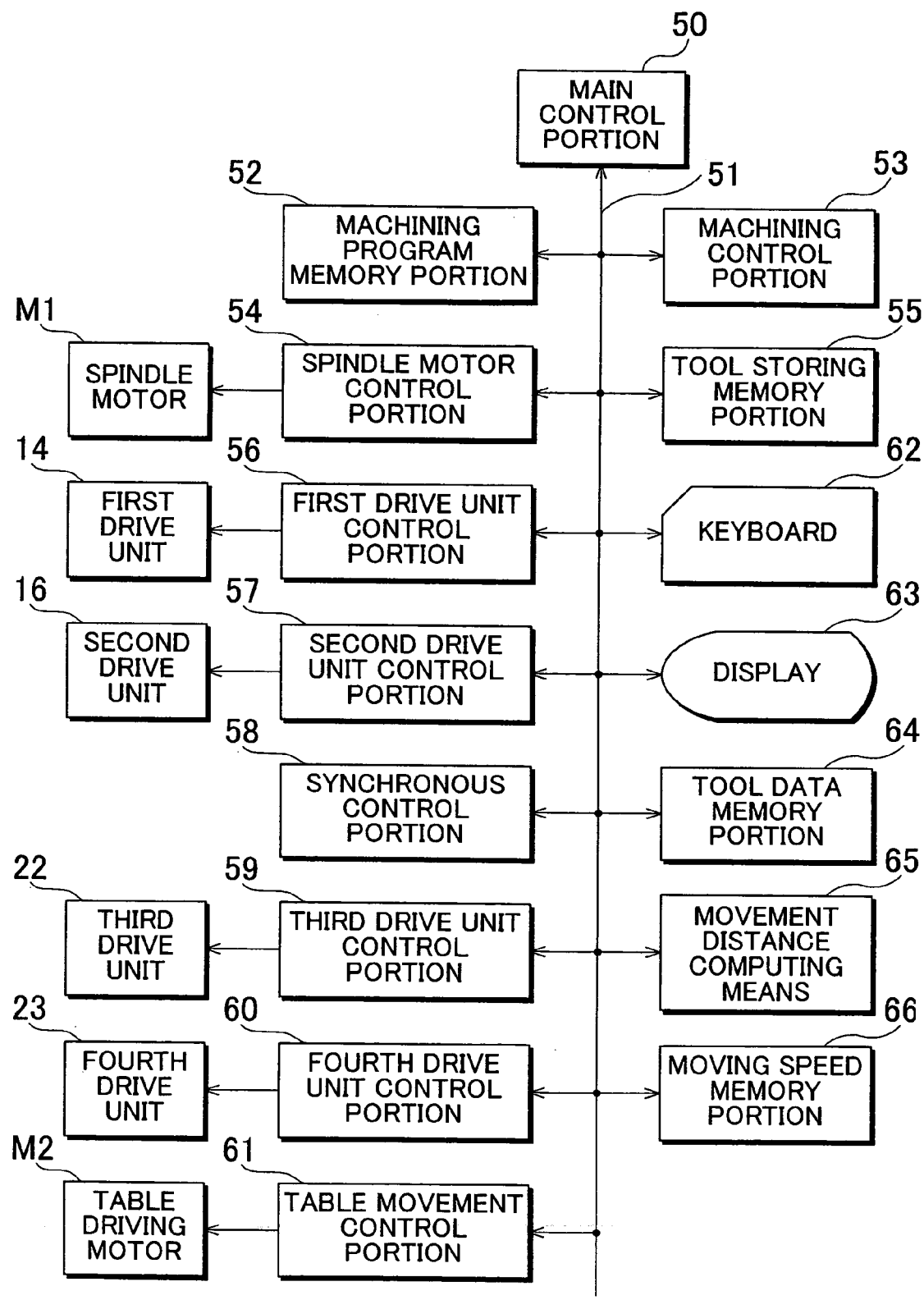
FIG. 3 is a block diagram showing a structure of a control unit of the machining centre according to the invention.
Figure 4:
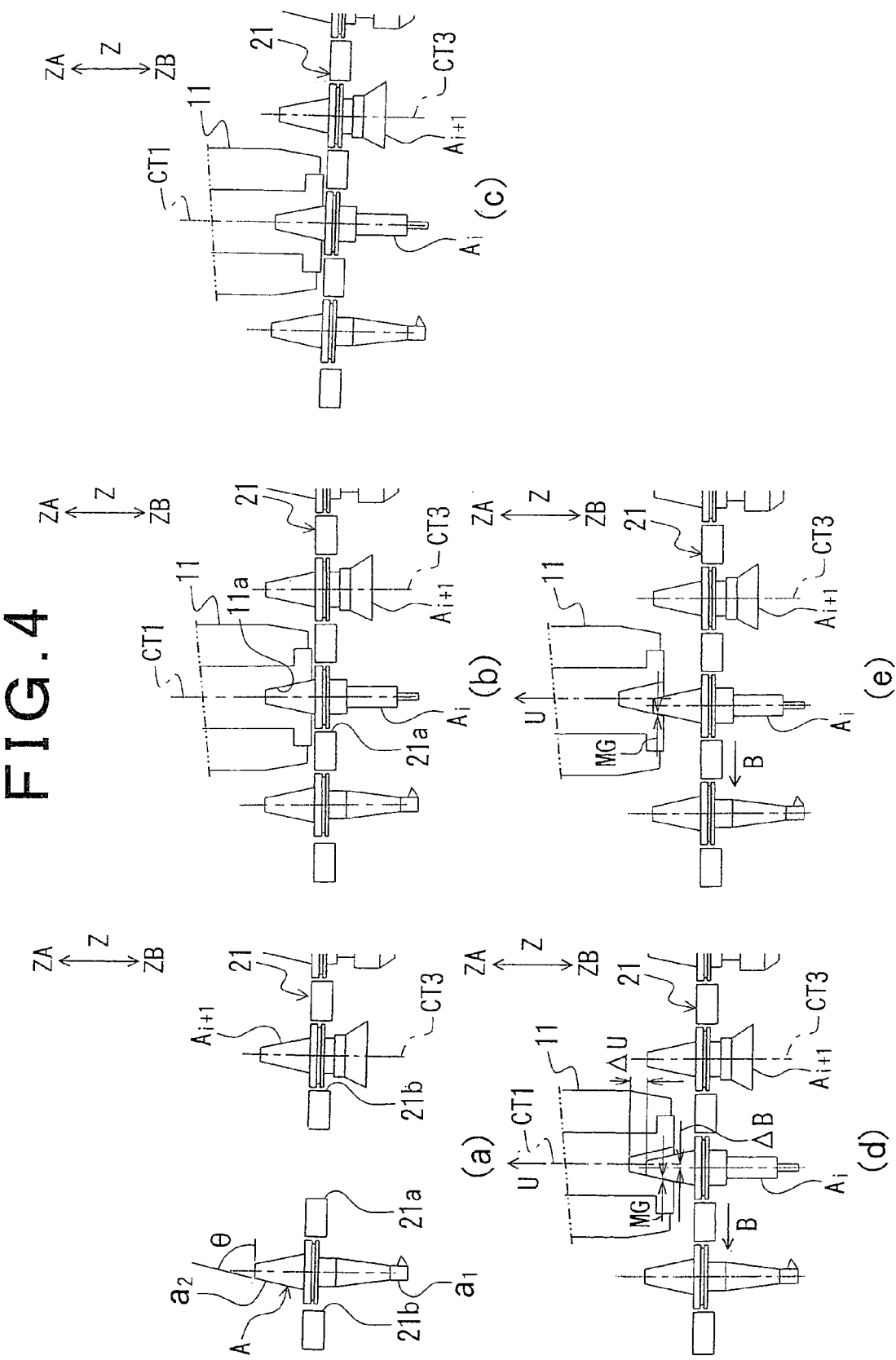
FIGS. 4(*a*) through (*e*) are typical views showing ways of detaching a tool of a spindle and storing it in a tool magazine.
Figure 5:
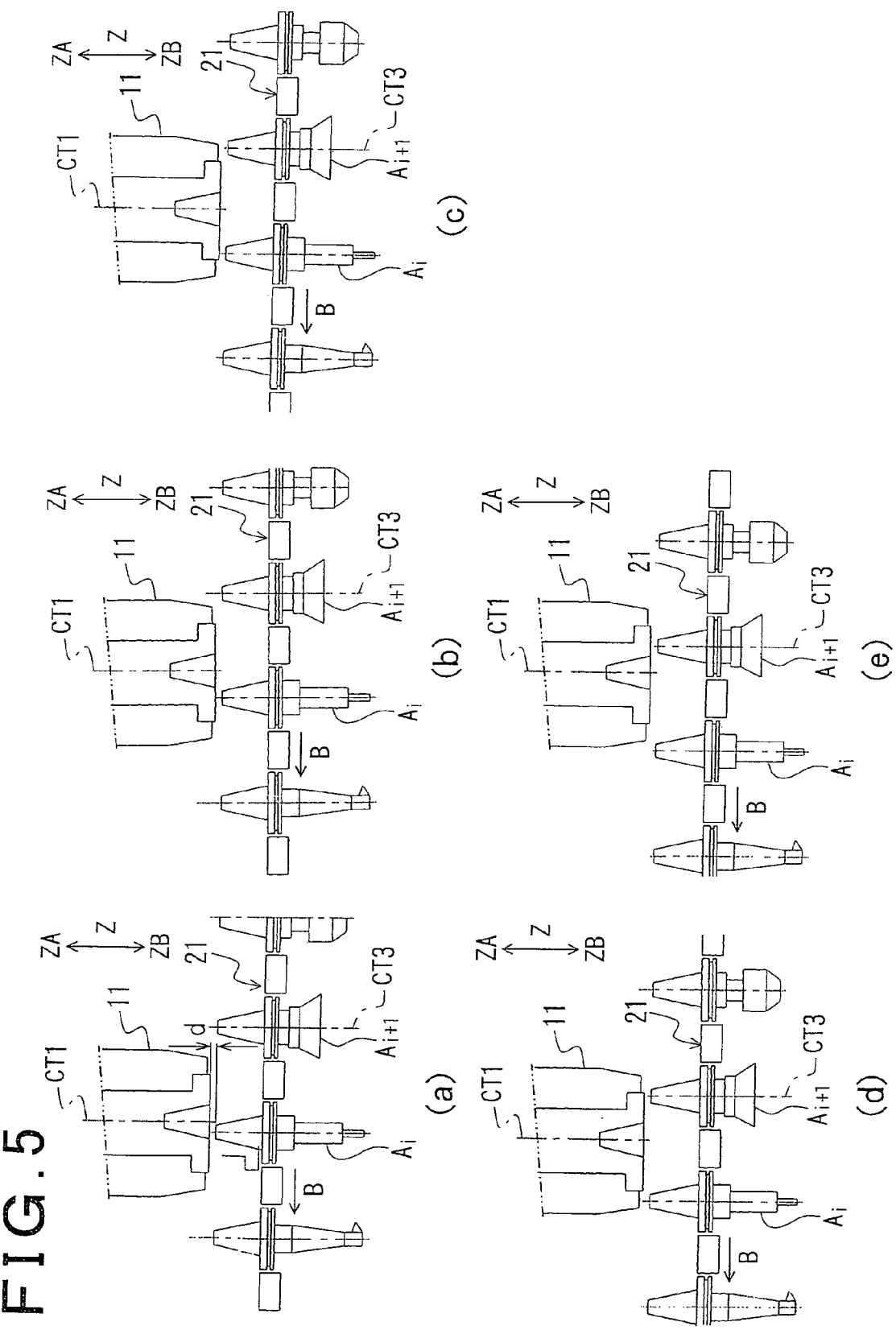
FIGS. 5(*a*) through (*e*) are typical views showing ways of moving the tool magazine.
Figure 6:
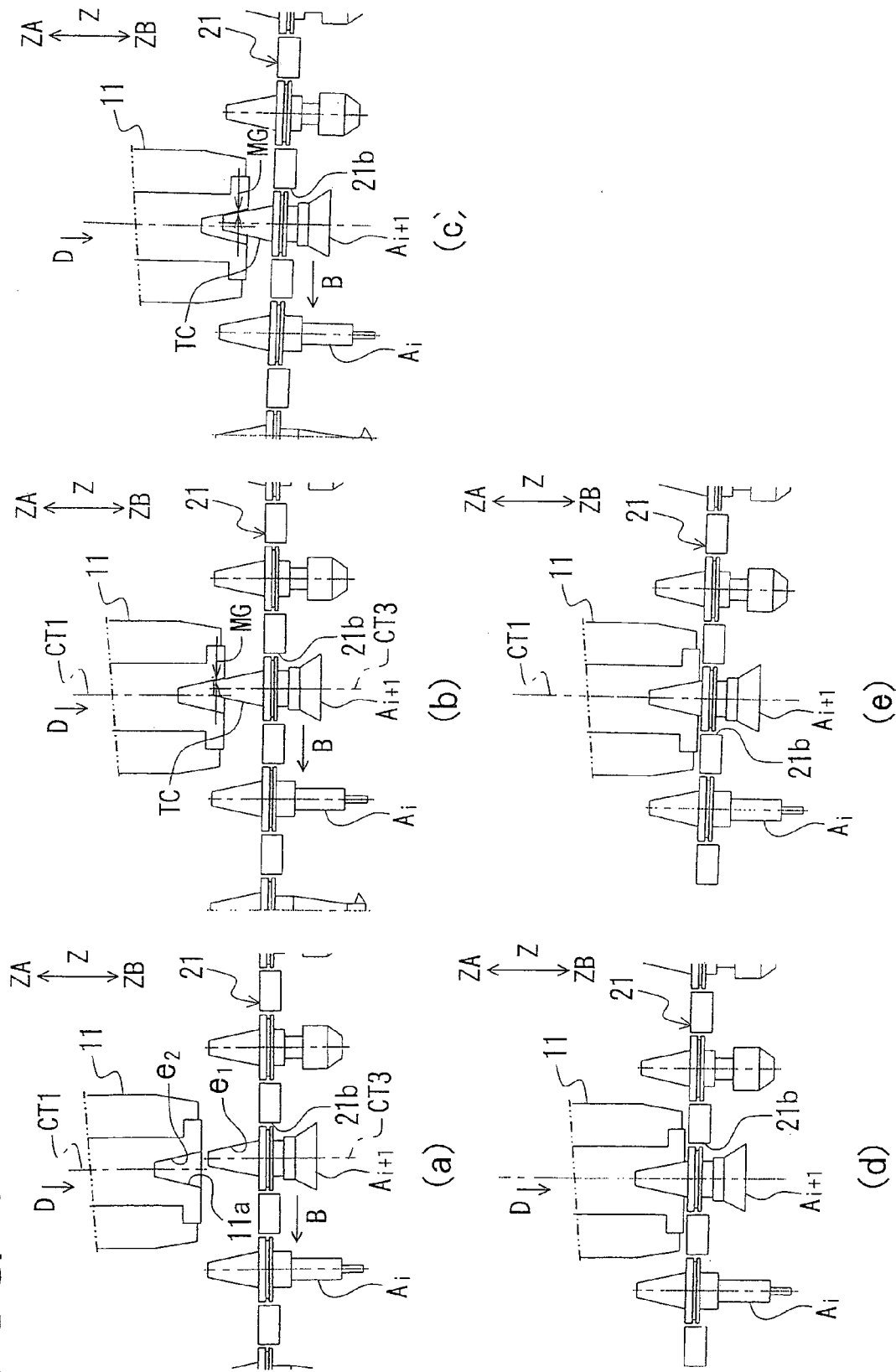
FIGS. 6(*a*) through (*e*) are typical views showing ways of installing the tool in the spindle.

FIG. 1 is a side view showing a structure of a machining centre according to the invention, FIG. 2 is a top view showing a structure of the machining centre according to the invention, FIG. 3 is a block diagram showing a structure of a control unit of the machining centre according to the invention, FIGS. 4 (*a*) through (*e*) are typical views showing ways of detaching a tool of a spindle and storing it in a tool magazine, FIGS. 5(*a*) through (*e*) are typical views showing ways of moving the tool magazine, and FIGS. 6(*a*) through (*e*) are typical views showing ways of installing the tool in the spindle.

As shown in FIG. 1, a machining centre 1 according to the invention has a spindle 11 for attachably and detachably supporting a tool Ai (only upper portion is shown), and a tool magazine 21 having a plurality of tool pockets 21*a*, 22*b* (see FIG. 2) for storing tools Ai−1 and Ai+1. At least one pocket 21*a* in the tool magazine 21 is an empty tool pocket storing no tool, as shown in FIG. 4(*a*), and is for storing the tool Ai detached from the spindle 11 (it is referred to as "the empty pocket" in this specification). And, at least one pocket 21*b* is a pocket storing the tool Ai+1 different from one installed in the spindle 11 (it is simply referred to as "the tool pocket"). The machining centre 1 according to the invention is designed to machine a workpiece W by driving the tool with the spindle 11, properly exchanging the tool with the tool magazine 21. The tools are exchanged by only moving and positioning operations of the tool magazine 21 and the spindle 11 without using an arm dedicated for tool exchange. That is, so-called armless typed automatic tool exchanger is used.

In order to simplify the explanation in this specification, the tool which is stored in the spindle 11 is referred to as "the present tool Ai", the tool which is detached from the spindle 11 is as "the former tool Ai−1", and the tool which is scheduled to be installed in the spindle 11 in place of the present tool is as "the next tool Ai+1". But, the tool is referred to as only "the tool A" if special differentiation or emphasis is not necessary.

The tool A to be used in this machining centre 1 has a tool portion a1 for performing machining on the workpiece W and a taper shank portion a2 having a cone-like shape, as shown in FIG. 4(*a*), and is stored in the pocket 21*a* or 21*b* in such a state that the taper shank portion projects therefrom. And, the spindle 11 has a tapered tool installation portion 11*a*, and the tool A is held by the spindle 11 with an engagement between the tool installation portion 11*a* and the taper shank portion a2 of the tool A. The upper portion of the taper shank portion a2 is thinner than the lower portion, allowing to simultaneously drive the spindle 11 and the tool magazine 21 (and to cross movement directions of the spindle and the pocket at right angles), as shown with arrows B and U of FIGS. 4(*d*), (*e*) and the arrows B and D of FIGS. 6(*b*), (*c*). The details are shown below.

The spindle 11 is supported by a spindle head 12 so as to be freely driven and rotated, and is driven and rotated by a spindle motor M1 (see FIG. 3). And, the spindle head 12 is supported by a column portion 13, allowing to move in an axial center CT1 direction of the spindle 11 (Z-axis direction). A first drive unit 14 is provided between the spindle head 12 and the column portion 13 so that the spindle head 12 can be driven and moved in the direction of the spindle 11 together therewith. Furthermore, the column portion 13 is supported by a base portion 15 so that the portion 13 can move in a horizontal direction (Y-axis direction). A second drive unit 16 is provided between the column portion 13 and the base portion 15 so that the column portion 13 and the spindle head 12 can be moved in the Y-axis direction together with the tool Ai. The workpiece W is machined by driving the tool Ai supported by the spindle 11 with the spindle motor M1, the first drive unit 14 and the second drive unit 16. The first drive unit 14 and the second drive unit 16 are comprised of ball screw 141, 161 and servo motors 142, 162. That is, a well-known drive unit for converting rotary motion into linear motion can be used for both drive units.

The workpiece W may be located on a table 31 which is on the lower side of the spindle 11. Preferably, the table 31 is freely moved in a horizontal plane, and is driven and moved by a table driving motor M2 (see FIG. 3).

The tool pockets 21a, 21b of the tool magazine 21 move in a B direction orthogonal to the direction of the axial center of the spindle (the direction orthogonal includes a direction almost orthogonal in this specification) by the third drive unit 22 and a third drive unit control portion 59 (see FIG. 3). More detailedly, the third drive unit 22 and the third drive unit control portion 59 drive and move the respective tool pockets 21a, 21b when performing both routines, a tool detachment routine described later of moving the empty pocket 21a to a standard position A0 (tool exchange position) and stopping, moving the spindle 11 to the position A0 and receiving the tool Ai from the spindle 11, and a tool installation routine as described later of moving the tool pocket 21b which stores the next tool therein to the tool exchange position A0 and stopping, moving the spindle 11 to the position A0 and installing the next tool Ai+1 in the spindle 11. In other words, both the third drive unit 22 and the third drive unit control portion 59 comprise a pocket drive control portion for switching the tool pocket adjacent to the spindle 11 by bringing the empty pocket 21a close to the spindle 11 (see FIGS. 4(a), (b)) and bringing the tool pocket 21b (the pocket storing the next tool Ai+1 therein) close to the spindle 11 (see FIG. 6(a)). Preferably, the tool magazine 21 is supported around an axial center CT2 (see FIG. 1) parallel to the axial center CT1 of the spindle 11 so as to be freely driven and rotated, and is driven and rotated by the third drive unit 22. And, the empty pockets 21a and the tool pockets 21b are preferably located along a concentric circle 24 (see FIG. 2) a center of which is the axial center CT2 in the tool magazine 21. The number of the empty pockets 21a may be one or more, and the number of the tool pockets 21b may be one or more. Besides, the tool magazine may have the empty pockets and the tool pockets which are connected through a chain.

It is preferable to retreat the whole tool magazine 21 from the tool exchange position A0 in order to avoid the collision when machining a workpiece although it is necessary to stop the empty pocket 21a or the tool pocket 21b at the tool exchange position A0 when exchanging a tool. Then, the tool magazine 21 may be movable together with the third drive unit 22, and may be driven and moved by a fourth drive unit 23 (see FIG. 3) so that it can be moved to a position where the tool exchange position A0 corresponds with a position of the pocket 21a or 21b when exchanging and installing a tool between the spindle 11 and the magazine 21, and it can be moved to a position having no collision with the spindle 11 or the other operating portions when machining the workpiece W. The tool magazine 21 of the machining centre 1 as shown in FIG. 1 can be moved in a direction the same as one in which the column 13 moves (that is, in the Y-axis direction), but it is sufficient to move the tool magazine 21 in a direction almost orthogonal to the Z-axis direction. Then, the tool magazine 21 may be moved in a direction rather than the Y-axis direction, such as a direction perpendicular to a paper face).

As shown in FIG. 3, the machining centre 1 has a main control portion 50. A machining program memory portion 52, a machining control portion 53, a spindle motor control portion 54, a tool storing memory portion 55, a first drive unit control portion 56, a second drive unit control portion 57, a synchronous control portion 58, a third drive unit control portion 59, a fourth drive unit control portion 60, a table movement control portion 61, a keyboard 62, a display 63 and a tool data memory portion 64 are connected with the main control portion 50 through a bus line 51.

The first drive unit control portion 56 controls to drive the first drive unit 14, the second drive unit control portion 57 controls to drive the second drive unit 16, the third drive unit control portion 59 controls to drive the third drive unit 22, and the fourth drive unit control portion 60 controls to drive the fourth drive unit 23.

The first drive unit control portion 56 and the first drive unit 14 comprise a spindle drive control portion for driving and moving the spindle 11 in its axial direction, and can perform at least one routine of a tool detachment routine as shown in FIGS. 4(a) through (e) for driving and moving the spindle 11 in its axial center direction U and detaching a tool from the spindle 11 after storing the tool Ai in the empty pocket 21a, and a tool installation routine as shown in FIGS. 6(a) through (e) for driving and moving the spindle 11 in its axial center direction D so as to install the next tool Ai+1 which is stored in the tool pocket 21b in the spindle 11.

The synchronous control portion 58 controls the spindle drive control portion and the pocket drive control portion in order to simultaneously move the spindle 11 in its axial center direction U or D and to move the tool pockets 21a, 21b in the B direction orthogonal to the axial center direction when executing the tool detachment routine and the tool installation routine. That is, in the machining centre 1 according to the invention, the pocket drive control portions 59 and 22 move the pockets 21a, 21b in the B direction (the direction orthogonal to one of the axial center of the spindle) while the spindle drive control portions 56, 14 move the spindle 11 in the axial center direction U or D in at least either routine of the tool detachment routine and the tool installation routine.

Figure 8:
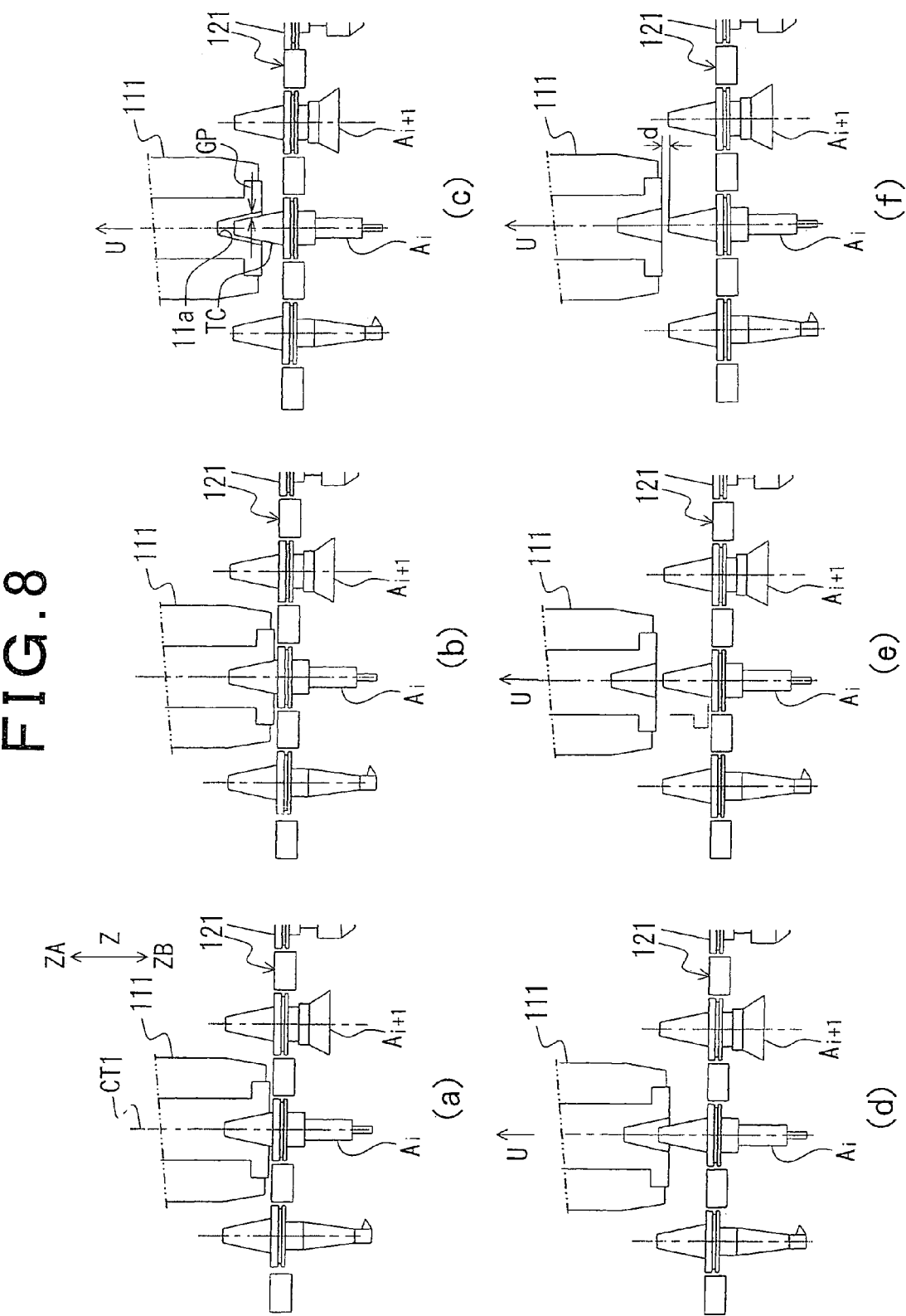
FIG. 8 is a typical explanation view showing ways of detaching the tool of the spindle and storing it in the tool magazine in a conventional tool exchange method.
Figure 9:
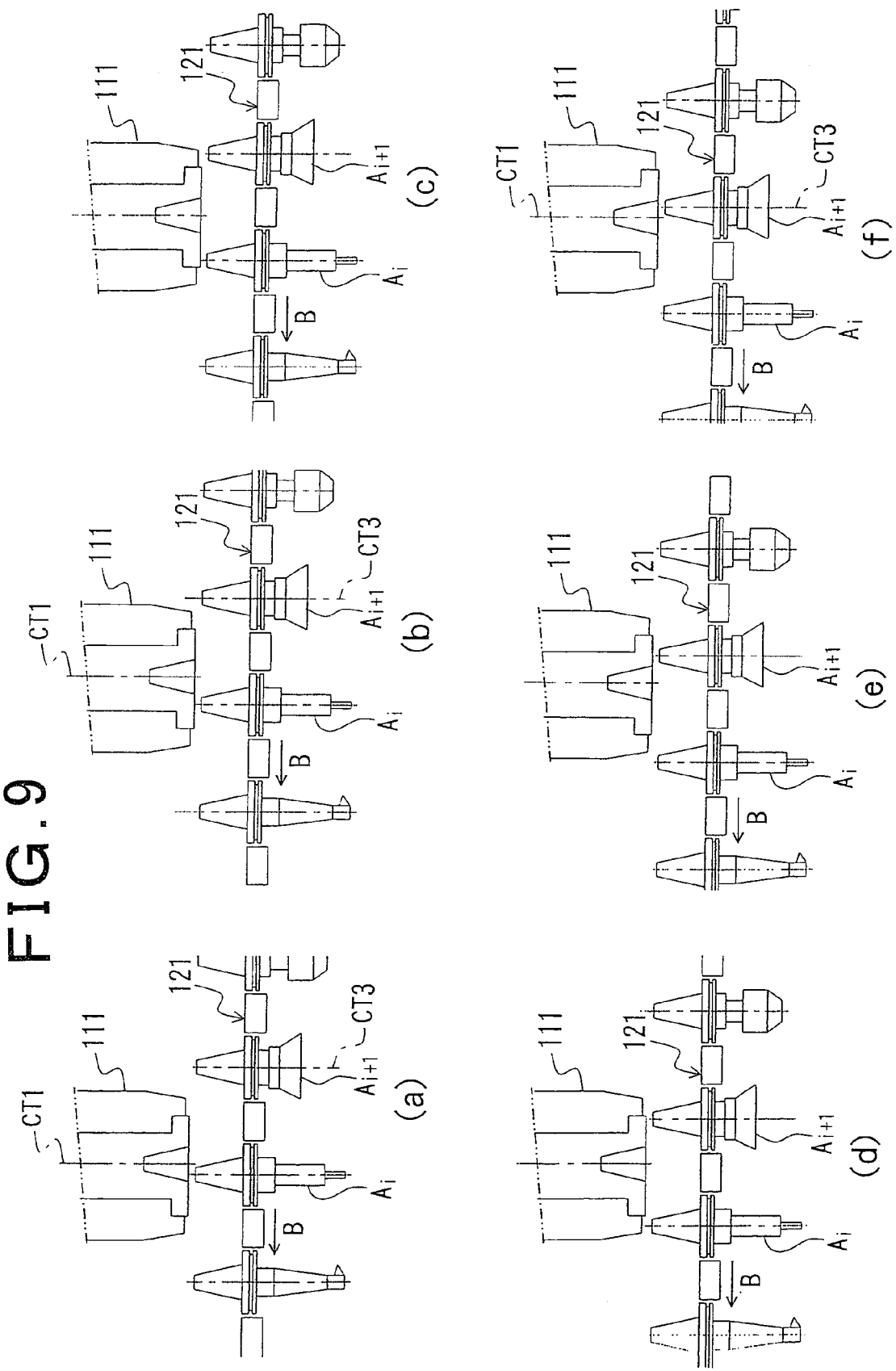
FIG. 9 is a typical view showing ways of moving the tool magazine in the conventional tool exchange method.

With such a structure, this machining centre 1 has a shorter tool exchange time and higher producibility in comparison with the case where the spindle and the tool magazine are not simultaneously moved (see FIGS. 8 through 10). When driving and moving the tool magazine 21 in both routines of the tool detachment routine and the tool installation routine, not in either routine, the tool exchange time is furthermore shorter. In the machining centre 1 according to the invention, an armless typed automatic tool exchanger is adopted, so that the effects specific for the armless type can be obtained. That is, this machining centre 1 has a structure more simple than the type with arm, thereby decreasing the cost and failure occurrence.

When the spindle 11 is raised ΔU in the axial center direction in the tool detachment routine (in the state that the tool magazine 21 stops) (see FIG. 4(d)), a clearance is formed between the spindle 11 and the tool Ai in the B direction. The dimension of the clearance can be obtained with the shape of the tool Ai (that is, an inclination and a height of the taper shank portion a2) and the upwardly moved distance ΔU of the spindle 11. As shown in FIG. 3, it is preferable to provide the tool data memory portion 64 for storing data of the tool A shape (that is, an inclination and a height of the taper shank portion a2), and to provide a movement distance computing means 65 for obtaining a movement distance for which the tool pockets 21a, 21b can be moved with no collision between the spindle 11 and the tool Ai (that is, the distance in the B direction for which the tool pockets can be moved, maintaining a minimum gap MG as shown in FIG. 4(d)) on the basis of the movement distance ΔU of the spindle 11 and the data in the tool data memory portion 64 (that is, data concerning tool shapes owned by the tool data memory portion 64), and to get the synchronous control portion 58 to perform the routine, moving the tool pockets 21a, 21b for the movement distance obtained by the movement distance computing means 65. Such a control may be also performed in the tool installation routine in addition to the tool detachment routine.

In the above-mentioned instance, the movement distance of the tool pockets 21a, 21b in the B direction was obtained from the movement distance of the spindle 11 in the axial center direction U or D. But, the movement distance of the spindle 11 in the axial direction U or D may be obtained from the movement distance of the tool pockets 21a, 21b in the B direction. That is, it is preferable that the movement distance computing means 65 obtains the movement distance necessary for moving the spindle 11 with no collision between the spindle 11 and the tool Ai (that is, the necessary movement distance in the D direction, maintaining the minimum gap MG) on the basis of the movement distance of the tool magazine 21 and the data of the tool data memory portion 64, and the synchronous control portion 58 perform the routine, moving the spindle 11 for the movement distance obtained by the movement distance computing means 65.

In another method different from one of providing the movement distance computing means, a moving speed memory portion 66 for storing speed patterns of moving the spindle 11 in the axial center direction U or D (data showing change in time concerning speed to be moved for the spindle 11, "the spindle moving speed pattern" hereinafter) and speed patterns of moving the tool pockets 21a, 21b in the B direction orthogonal to the axial center direction (data showing change in time concerning speed to be moved for the tool pocket, "the tool pocket moving speed pattern" hereinafter) may be provided, so that the spindle drive control portion drives and moves the spindle 11 with the spindle moving speed pattern stored in the moving speed memory portion 66, and the pocket drive control portion drives and moves the tool pockets 21a, 21b with the tool pocket moving speed pattern stored in the moving speed memory portion 66. Furthermore, the synchronous control portion 58 may control a start timing of driving and moving the spindle 11 by the spindle drive control portion and a start timing of driving and moving the tool pockets 21a, 21b by the pocket drive control portion in order to prevent the collision between the spindle 11 and the tool Ai, Ai+1.

A tool is exchanged by executing the tool detachment routine, a routine of switching the tool pocket adjacent to the spindle by the pocket drive control portion ("the pocket switching routine" hereinafter") and the tool installation routine, so that the moving speed memory portion 66 may store a timing for switching these routines and the moving speed of the spindle and the tool pocket as moving speed patterns. In such a case, the spindle and the tool pocket are controlled on the basis of the respective moving speed patterns with only an instruction of the start timing of tool exchange (that is, the start timing of movement of the tool pocket in the direction orthogonal to the axial center direction of the spindle after starting the movement of the spindle in the axial center direction in the tool detachment routine) by the synchronous control portion 58, thereby finishing the tool detachment routine, the pocket switching routine and the tool installation routine. According to this method, no complex positional control is necessary during the movement, and the tool can be exchanged with the simple control. In this case, however, it is necessary for the moving speed memory portion 66 to store in advance some kinds of data corresponding to the distance between "the empty pocket in which the tool is to be stored in the tool detachment routine" and "the tool pocket storing the next tool to be installed in the tool installation routine" (the spindle moving speed pattern and the tool pocket moving speed pattern) since the timing of starting and finishing the pocket switching routine, which is controlled by the spindle moving speed pattern and the tool pocket moving speed pattern, is different according to the above-mentioned distance. When actually exchanging the tool, the data corresponding to the above-mentioned distance (the spindle moving speed pattern and the tool pocket moving speed pattern) is read out of the moving speed memory portion 66 at the time the distance is known, and the respective routines are executed on the basis of the data.

The spindle moving speed patterns and the tool pocket moving speed patterns have only information of moving speed of the spindle or the tool pocket in each routine, having no information of timing for switching each routine. In this case, the timing of starting and finishing the pocket switching routine is not controlled by the spindle moving speed pattern and the tool pocket moving speed pattern, so that it is not necessary to prepare some kinds of data according to the distance between "the empty pocket in which the tool is to be stored in the tool detachment routine" and "the tool pocket storing the next tool to be installed in the tool installation routine". But, it is necessary for the synchronous control portion 58 to also instruct the timing of executing the tool installation routine in addition to the timing of executing the tool detachment routine (that is, the timing of finishing the pocket switching routine).

It is preferable that the spindle drive control portion executes a spindle stop routine (see FIG. 5) of stopping the spindle 11 at a position where a collision is avoidable between the tools Ai, Ai+1 stored in the tool pockets 21a, 21b and the spindle 11 (a proper position in a direction as shown by arrows ZA and ZB) after executing the tool detachment routine (see FIGS. 4(a) through (e)), and thereafter, executes the tool installation routine (see FIG. 6). By doing so, the spindle can be prevented from unnecessarily separating from the tool magazine 21 in the Z-axis direction, that is, on the upper hand of FIG. 5.

As mentioned before, the pocket drive control portion may control to continue driving and moving the tool pockets 21a, 21b in one direction B orthogonal to the direction of the axial center of the spindle while the spindle drive control portion is executing the tool detachment routine, the spindle stop routine and the tool installation routine. By doing so, the tool exchange time can be furthermore shortened, thereby improving the producibility.

On embodiment of the invention is now explained.

In the embodiment of the invention, both the spindle 11 and tool magazine 21 are driven in the tool detachment routine (see reference numbers B, U of FIGS. 4(a) through (e)), thereafter only the tool magazine 21 is driven with the spindle being stopped (see B of FIGS. 5(a) through (e)), and both spindle 11 and the tool magazine 21 are driven in the tool installation routine (see B, D of FIGS. 6(a) through (e)) with the machining center having a structure as shown in FIGS. 1 through 3. An inclined angle of the taper shank portion a2 of the tool A in this embodiment is θ as shown in FIG. 4(a).

Machining operations and tool exchange operations of the machining centre according to this embodiment are now explained, referring to FIGS. 1 through 7.

When machining the workpiece W, the workpiece W to be machined is set on the table 31 and a predetermined tool Ai to be used for machining is installed in the spindle 11.

If an operator inputs an instruction of machining start through the keyboard 62 in the above-mentioned state, the main control portion 50 reads machining program out of the machining program memory portion 52 according to the instruction, and instruct the machining control portion 53 to execute the machining on the basis of the read machining program. Then, the machining control portion 53 drives and rotates the spindle motor M1 through the spindle motor control portion 54 so that the spindle 11 can be driven and rotated, and drives the first drive unit 14 and the second drive unit 16 through the first drive unit control portion 56 and the second drive unit control portion 57 so that the spindle 11 can be properly moved in a Z-axis direction and in a Y-axis direction, and drive a table driving motor M2 through the table movement control portion 61 so that the table 31 can be moved in a horizontal plane together with the workpiece W according to the machining program, and then machining on the workpiece W is executed.

Figure 7:
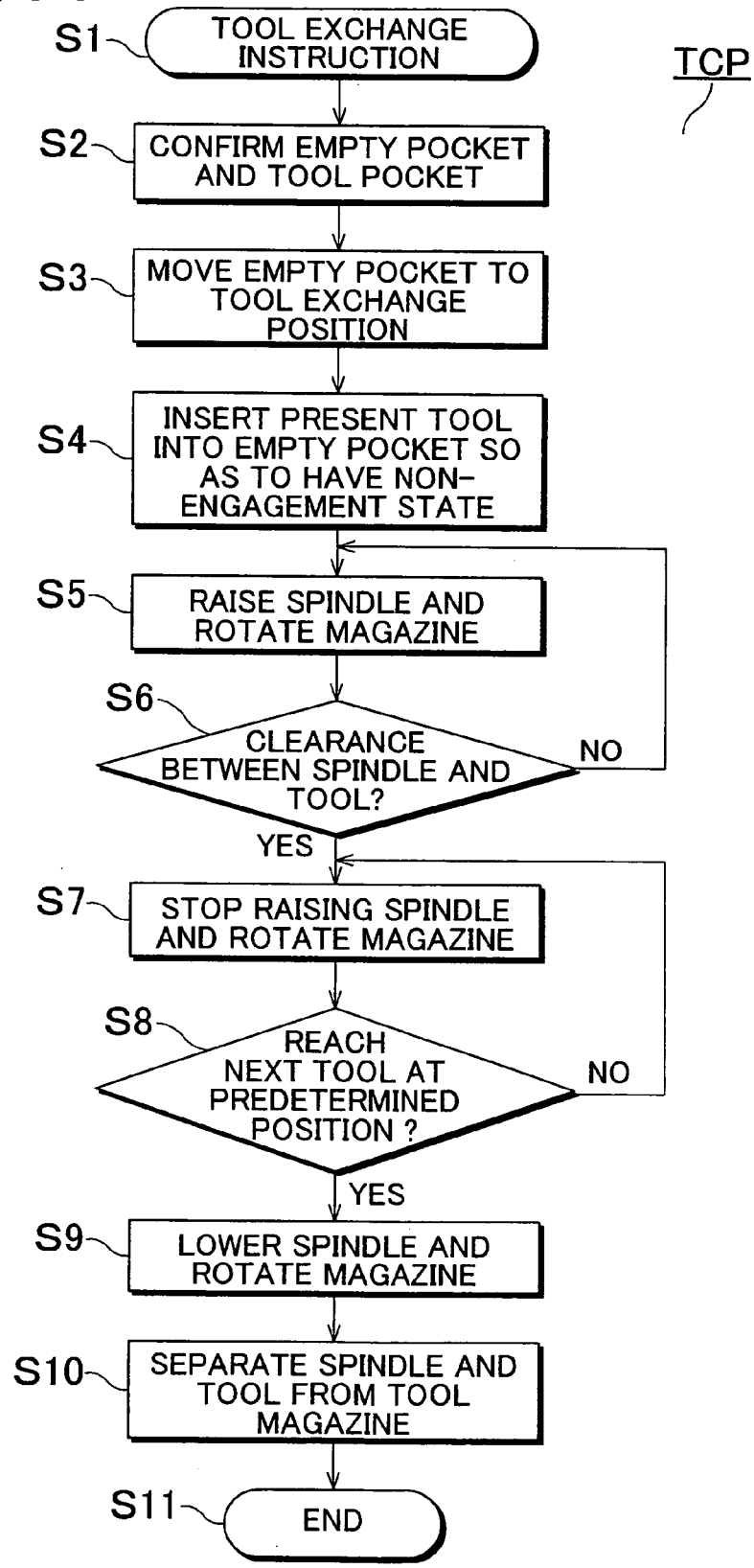
FIG. 7 is a flow chart showing routines for tool exchange.

If tool exchange is instructed according to the machining program during such a machining, a tool exchange control program TCP as shown in FIG. 7 is read out from a memory (not shown), and tool exchange operations are controlled on the basis of the tool exchange control program TCP. When outputting a tool exchange instruction in step S1 of the tool exchange control program TCP of FIG. 7, the main control portion 50 confirms the positions of the empty pocket 21a for storing the present tool Ai and the tool pocket 21b storing the next tool Ai+1 therein (confirms which pocket for storing the present tool Ai of the tool magazine is empty and in which pocket the next tool Ai+1 is entered), referring to the data in the tool storing memory portion 55 (see S2 of FIG. 7). In this embodiment, both empty pocket 21a and the tool pocket 21b are adjacent to each other for easy explanation (see FIG. 4(a)). Thereafter, the main control portion 50 moves the tool magazine 21 in the Y-axis direction (the left direction of FIG. 1) by driving the fourth drive unit 23 through the fourth drive unit control portion 60 so that the top pocket in the movement direction (which is different according to a rotational position of the tool magazine 21, but is the pocket 21a or 21b) can be corresponded with the tool exchange position A0. Furthermore, the main control portion 50 rotates the tool magazine 21 by driving the third drive unit 22 through the third drive unit control portion 59 so that the empty pocket 21a can be corresponded with the tool exchange position A0 (see S3 of FIG. 7 and FIG. 4(a)). Thereafter, the main control portion 50 drives the first drive unit 14 and the second drive unit 16 through the first and second drive unit control portions 56, 57 so as to insert the present tool Ai installed in the spindle 11 into the empty pocket 21a (from the side of the tool magazine 21), and releases an engagement between the tool and the spindle (see S4 of FIG. 7 and FIG. 4(b)).

If only the spindle 11 is raised ΔU along the axial center CT1 without moving the tool magazine 21, a clearance between the tool Ai and the spindle 11 in the axial center direction, engagement of which has been just released, is the very movement distance of the spindle 11, ΔU, and the clearance in the direction orthogonal to the axial center direction is ΔU/tan θ (θ is the inclined angle of the taper shank portion a2 as shown in FIG. 4(a)). But, the synchronous control portion 58 transfers a signal to the third drive unit control portion 59 at a predetermined timing so as to drive the third drive unit 22, and also rotates the tool magazine 21 in the B direction during the movement of the spindle 11 (tool detachment routine, see S5 of FIG. 7) in this embodiment.

Such upward movement of the spindle 11 reaches an occurrence of a clearance d in the axial center direction between a lower face of the spindle 11 and an upper face of the tool Ai. When such a clearance d occurs, the movement of the spindle 11 by the first drive unit 14 is stopped, and only the rotation of the tool magazine 21 by the third drive unit 22 is maintained (a spindle stop routine, see S6 and S7 of FIG. 7 and the mark B of FIGS. 5(a) through (e))

When rotating the next tool Ai+1 to be scheduled to be installed at a predetermined position (the position before corresponding a tool axial center CT3 and the spindle axial center CT1 with each other, such as a position where a contour e1 of the taper shank portion of the next tool Ai+1 is on an extension of a line e2 of the tool installation portion of the spindle 11) as shown in FIG. 6(a), the synchronous control portion 58 lowers the spindle 11 in the D direction while maintaining the rotation B of the tool magazine 21 (see the marks B, D of FIG. 6(b) through (d) and S8, S9 of FIG. 7). Then, the next tool Ai+1 is inserted into the spindle 11 so as to engage both with each other (see FIG. 6(e)), and thereafter the spindle 11 and the tool Ai+1 are separated from the tool magazine 21 (see S10 of FIG. 7).

If the danger of the collision between the tool Ai+1 and the tool magazine 21 passes, the main control portion 50 drives the fourth drive unit 23 through the fourth drive unit control portion 60 so that the tool magazine 21 is retreated in a direction as shown by an arrow YA.

Thereafter, the main control portion 50 restarts the machining operations on the workpiece according to the machining program.

In case of the machining centre to be used for the present embodiment, the tool exchange time is 1.02 second with the method as shown in FIGS. 8 through 10, but is shortened by 0.46 second (that is, the tool exchange time is 0.56) with the method as shown in FIGS. 4 through 6.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A machining centre having a spindle for executing machining operations on a workpiece by driving a tool attachably and detachably supported thereby, and a tool magazine having an empty pocket for storing said tool detached from said spindle and a further tool pocket for storing an another tool for installing in said spindle, said machining centre for executing machining operations on said workpiece by driving said tool through said spindle and for properly exchanging said tool with said tool magazine, said machining centre comprising:

a tapered tool installation portion formed at said spindle, for holding said tool by said spindle with an engagement with a taper shank portion of said tool;

a spindle drive control portion for executing at least one routine of both a tool detachment routine wherein said tool is stored in said empty tool pocket of said tool magazine, and then, said tool is detached from said spindle by driving and moving said spindle in a direction of an axial center of said spindle, and a tool installation routine wherein said spindle is driven and moved in said axial center direction in order to install said another tool stored in said further tool pocket in said spindle;

a pocket drive control portion for driving and moving at least one of said tool pockets in a direction orthogonal to said axial center direction of said spindle and for switching said at least one tool pocket adjacent to said spindle; and a synchronous control portion for controlling said spindle drive control portion and said pocket drive control portion so as to simultaneously move said spindle in said axial center direction and move said at least one tool pocket in a direction orthogonal to said axial center direction in order to execute said tool detachment routine or said tool installation routine.

2. The machining centre according to claim 1, wherein said spindle drive control portion executes a spindle stop routine of stopping said spindle at a position, where a collision is avoidable between said spindle and said tool stored in said tool pocket, after executing said tool detachment routine, and then executes said tool installation routine.

3. The machining centre according to claim 2, wherein said pocket drive control portion controls to continue moving and driving said at least one tool pocket in said direction orthogonal to said axial center direction while said spindle drive control portion is executing said tool detachment routine, said spindle stop routine and said tool installation routine.

4. The machining center according to claim 1, wherein a tool data memory portion for storing data of shapes of said tools is provided, and a movement distance computing means for obtaining a movement distance for moving the at least one tool pocket or said spindle with no collision between said spindle and said tools on the basis of a movement distance of said spindle or said at least one tool pocket and said data of said shapes of said tools owned by said tool data memory portion is provided, and said synchronous control portion executes said respective routines while moving said spindle or said at least one tool pocket by said movement distance obtained by said movement distance computing means.

5. The machining centre according to claim 1, wherein a moving speed memory portion for storing spindle moving speed patterns showing moving speed of said spindle in said axial center direction and tool pocket moving speed patterns showing moving speed of said at least one tool pocket in said direction orthogonal to said axial center direction is provided, and said spindle drive control portion drives and moves said spindle with said spindle moving speed pattern stored in said moving speed memory potion, and said pocket drive control portion drives and moves said at least one tool pocket with said tool pocket moving speed pattern stored in said moving speed memory portion, and said synchronous control portion controls start timing of movement and driving of said spindle with said spindle drive control portion and start timing of movement and driving of said at least one tool pocket with said pocket drive control portion.

6. The machining centre according to claim 1, wherein a tool data memory portion for storing data of shapes of said tools is provided, and a movement distance computing unit for obtaining a movement distance for moving the at least one tool pocket or said spindle with no collision between said spindle and said tools on the basis of a movement distance of said spindle or said at least one tool pocket and said data of said shapes of said tools owned by said tool data memory portion is provided, and said synchronous control portion executes said respective routines while moving said spindle or said at least one tool pocket by said movement distance obtained by said movement distance computing unit.

* * * * *